United States Patent
Yang et al.

(10) Patent No.: US 11,019,644 B2
(45) Date of Patent: May 25, 2021

(54) SYSTEMS AND METHODS FOR A MULTI-TIER SELF-ORGANIZING NETWORK ARCHITECTURE

(71) Applicant: Verizon Patent and Licensing Inc., Arlington, VA (US)

(72) Inventors: Jin Yang, Orinda, CA (US); Krishna K. Bellamkonda, Roanoke, TX (US); Vijay T. Madhav, Houston, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 4 days.

(21) Appl. No.: 16/570,016

(22) Filed: Sep. 13, 2019

(65) Prior Publication Data
US 2021/0084671 A1  Mar. 18, 2021

(51) Int. Cl.
| | |
|---|---|
| *H04W 72/12* | (2009.01) |
| *G06N 20/00* | (2019.01) |
| *H04W 24/08* | (2009.01) |
| *H04W 84/18* | (2009.01) |

(52) U.S. Cl.
CPC ........ *H04W 72/1263* (2013.01); *G06N 20/00* (2019.01); *H04W 24/08* (2013.01); *H04W 84/18* (2013.01)

(58) Field of Classification Search
CPC ............... H04W 28/021; H04W 84/18; H04W 72/1263; H04W 24/08; G06N 20/00
See application file for complete search history.

(56) References Cited

U.S. PATENT DOCUMENTS

| | | | |
|---|---|---|---|
| 2016/0014618 A1* | 1/2016 | Yang | H04L 67/12 370/254 |
| 2017/0019811 A1* | 1/2017 | Parulkar | H04L 41/0654 |
| 2018/0124859 A1* | 5/2018 | Cho | H04W 36/0009 |
| 2018/0279192 A1* | 9/2018 | Raissinia | H04W 36/38 |
| 2018/0343567 A1* | 11/2018 | Ashrafi | H04L 67/10 |
| 2019/0159048 A1* | 5/2019 | Feldkamp | H04W 24/08 |
| 2020/0077287 A1* | 3/2020 | Prasad | H04W 24/10 |
| 2020/0146025 A1* | 5/2020 | Choi | H04B 7/155 |

(Continued)

OTHER PUBLICATIONS

Title: A Survey of the Functional Splits Proposed for 5G Mobile Crosshaul Networks; Authors: Line M. P. Larsen , Aleksandra Checko, and Henrik L. Christiansen; Oct. 2, 2018 (Year: 2018).*

(Continued)

*Primary Examiner* — Hassan A Phillips
*Assistant Examiner* — Mohammed S Chowdhury

(57) ABSTRACT

A middle-tier self-organizing network (mSON) may obtain configuration parameters concerning a cluster, one or more operating profiles, and one or more usage schedules respectively associated with the one or more operating profiles, from a centralized self-organizing network (cSON). The mSON may identify a distributed self-organizing network (dSON) of one or more dSONs associated with the cluster and may select, based on identifying the dSON, an operating profile, of the one or more operating profiles, and a respective usage schedule of the one or more usage schedules. The mSON may generate, based on the configuration parameters, monitoring information, and may send the operating profile, the usage schedule, and the monitoring information to the dSON.

20 Claims, 11 Drawing Sheets

(56) References Cited

U.S. PATENT DOCUMENTS

2020/0260403 A1\* 8/2020 Raghothaman ......... H04W 4/33
2020/0351717 A1\* 11/2020 Bernstein .............. H04W 24/02

OTHER PUBLICATIONS

Title: Fronthaul and Backhaul Requirements of Flexibly Centralized Radio Access Networks; Authors: Jens Bartelt, Peter Rost, Dirk Wübben, Johannes Lessmann, Bruno Melis, and Gerhard Fettweis; Oct. 2015 (Year: 2015).\*

Title: Toward an Intelligent, Multipurpose 5G Network; Authhor: Jin Yang and Yee-Sin Chan (inventors of the instant application); Apr. 18, 2019 (Year: 2019).\*

3GPP TR 38.801 V14.0.0 (Mar. 2017); Study on new radio access technology: Radio access architecture and interfaces (Release 14); (Year: 2017).\*

\* cited by examiner

US 11,019,644 B2

SYSTEMS AND METHODS FOR A MULTI-TIER SELF-ORGANIZING NETWORK ARCHITECTURE

BACKGROUND

Self-organizing networks (SONs) may be deployed to automatically manage functions of wireless telecommunications networks, such as 4G and 5G wireless networks. For example, SON functions may be used to improve coverage or capacity of a wireless telecommunications network.

DETAILED DESCRIPTION OF PREFERRED EMBODIMENTS

Figure 1A:
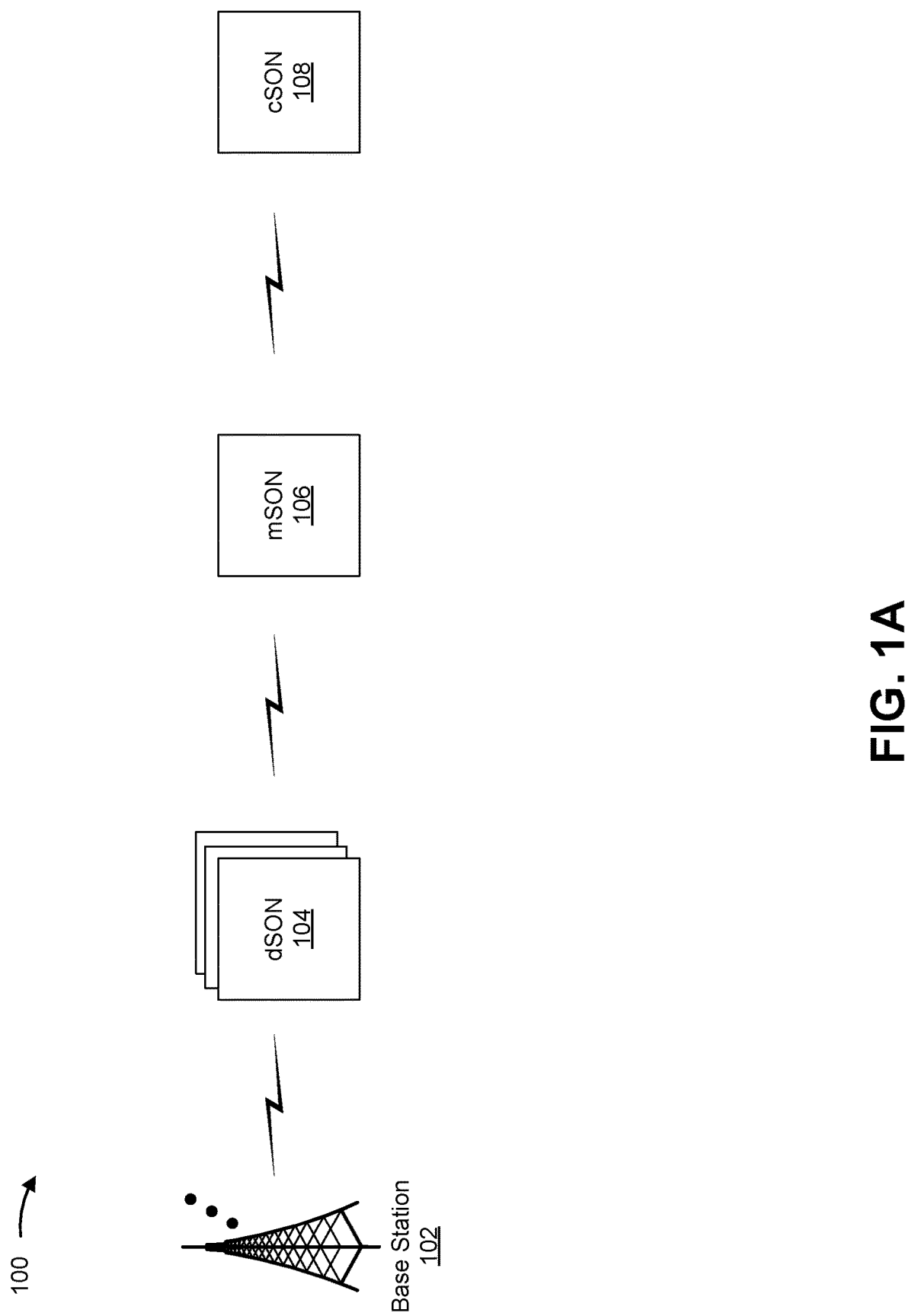
FIGS. 1A-1F are diagrams of one or more example implementations described herein.

The following detailed description of example implementations refers to the accompanying drawings. The same reference numbers in different drawings may identify the same or similar elements.

A wireless telecommunications network may utilize one or more technologies to automate functions of the wireless telecommunications network. For example, a wireless telecommunications network may utilize self-organizing network (SON) technology to plan, configure, manage, and/or optimize functions of the wireless telecommunications network. In some cases, the wireless telecommunications network may use a centralized self-organizing network (cSON) (e.g., associated with a backhaul portion of the wireless telecommunications network) and one or more distributed self-organizing networks (dSONs) (e.g., associated with a fronthaul portion of the wireless telecommunications network). The cSON may obtain information regarding performance of the wireless telecommunications network and generate operating profiles to optimize performance of different elements of the wireless telecommunications network. The cSON may send an operating profile to a dSON, which may apply the operating profile to control functionality of a base station of the wireless telecommunications network. The dSON may be able to react to real-time, practical conditions experienced by the base station (e.g., by adjusting base station settings), but functionality of the dSON is limited by parameters set forth in the operating profile. Moreover, in some cases, the dSON and cSON only communicate at particular times, which prevents the dSON from obtaining an updated operating profile to address short-term base station performance changes.

Some implementations described herein provide a multi-tier self-organizing network architecture that includes a cSON, one or more dSONs, and a middle-tier self-organizing network (mSON) (e.g., associated with a midhaul portion of a wireless telecommunications network). In some implementations, the cSON may generate, based on configuration parameters of a cluster of the wireless telecommunications network, one or more operating profiles and one or more respective usage schedules. In some implementations, the cSON may send the configuration parameters, the one or more operating profiles, and the one or more respective usage schedules to the mSON. In some implementations, the mSON may identify the dSON and may select and send an operating profile and a respective usage schedule to the dSON. In some implementations, the dSON may apply the operating profile according to the respective usage schedule to control operation of a base station associated with the dSON. In some implementations, the dSON may monitor at least one performance indicator of the base station and may send performance information to the mSON. In some implementations, the mSON may select a different operating profile and a respective different usage schedule and may send the different operating profile and the different usage schedule to the dSON (e.g., for the dSON to control operation of the base station).

In this way, some implementations described herein enable the dSON to obtain an updated operating profile (e.g., that may optimize a performance of the base station associated with the dSON) based on sending performance information to the mSON. In some implementations, the mSON may communicate with the dSON on a more frequent basis than the dSON would otherwise communicate with the cSON, and/or a latency (e.g., an end-to-end communications transmission time) associated with communicating between the dSON and the mSON may be lower than a latency associated with communicating between the dSON and the cSON (e.g., because the dSON and the mSON may be physically closer to each other than the dSON and the cSON). This may allow the dSON to quickly obtain and apply the updated operating profile, which may mitigate an inefficient use of base station resources that would otherwise occur in a SON architecture without an mSON.

Moreover, in some implementations, the mSON may provide reactive functionality (e.g., to performance information obtained from the dSON) that the cSON cannot otherwise provide. Further, the mSON may provide processing functionality (e.g., to select an appropriate operating profile for the dSON) that the dSON cannot otherwise provide (e.g., because of limited dSON computing resources). In this way, the mSON may increase a likelihood of an optimal use of resources of the base station and/or of the wireless telecommunications network while allowing the dSON to focus on controlling and monitoring operation of the base station and allowing the cSON to focus on processing large amounts of performance information to generate new operating profiles.

FIGS. 1A-1F are diagrams of one or more example implementations 100 described herein. Example implementation(s) 100 may include one or more base stations 102, one or more distributed self-organizing networks (dSONs) 104, a middle-tier self-organizing network (mSON) mSON 106, and a centralized self-organizing network (cSON) 108. The one or more base stations 102, the one or more dSONs 104, the mSON 106, and the cSON 108 may be associated with a wireless telecommunications network. For example, a base station 102 and a dSON 104 may be associated with a fronthaul portion of the wireless telecommunications network (e.g., the dSON 104 may be located at and/or associated with the base station 102 and/or a baseband distributed unit), the mSON 106 may be associated with a midhaul and/or backhaul portion of the wireless telecommunications network (e.g., the mSON 106 may be located at and/or associated with a baseband centralized unit), and/or the cSON 108 may be associated with a transport portion of the wireless telecommunications network (e.g., the cSON 108 may be located at and/or associated with a network management system).

Figure 1B:
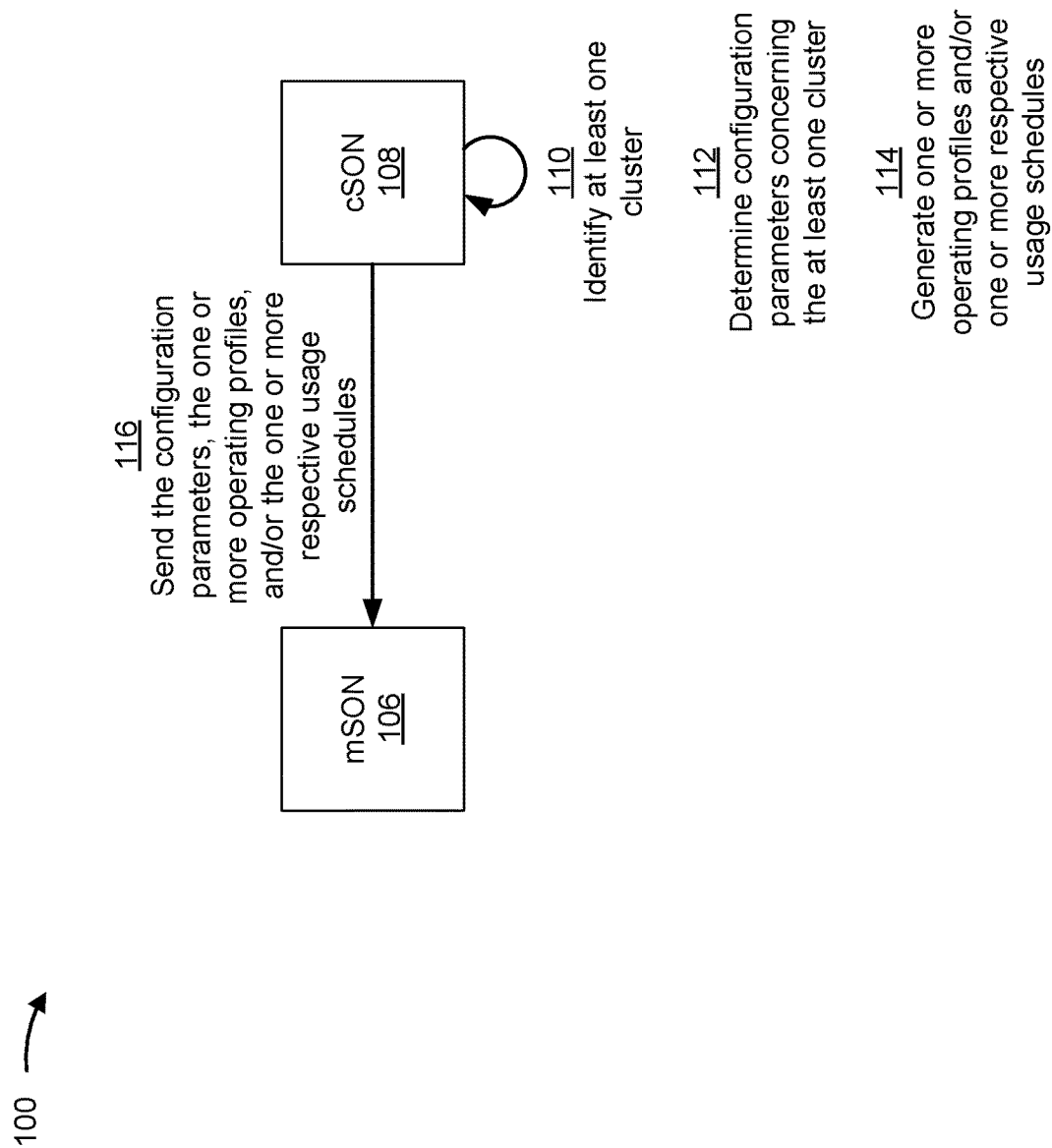

As shown in FIG. 1B and by reference number 110, the cSON 108 may determine and/or identify at least one cluster of the wireless telecommunications network. A cluster may include one or more dSONs 104 and one or more base stations 102 (e.g., a cluster may be a segment of the fronthaul portion of the wireless telecommunications network). For example, a cluster may include one or more dSONs 104 and one or more base stations 102 associated with an area (e.g., an area associated with one or more city square blocks, an area associated with one or more square miles or square kilometers, and/or the like).

As shown by reference number 112, the cSON 108 may determine configuration parameters concerning the at least one cluster. The configuration parameters may set and/or define requirements for the at least one cluster (e.g., for all or a set of the one or more dSONs 104 and the one or more base stations 102 of the at least one cluster, for all or a set of user devices that connect to the at least one cluster, and/or the like). For example, the configuration parameters may include a data rate requirement (e.g., minimum and/or maximum download and upload bitrates supported by the one or more dSONs 104 and the one or more base stations 102); a density requirement (e.g., a number of communication sessions (e.g., with user devices) supported by the one or more dSONs 104 and the one or more base stations 102; a latency performance requirement (e.g., an end-to-end communications transmission time requirement supported by the one or more dSONs 104 and the one or more base stations 102); a mobility requirement (e.g., a speed range of traveling user devices supported by the one or more dSONs 104 and the one or more base stations 102); and/or the like).

As shown by reference number 114, the cSON 108 may generate one or more operating profiles and/or one or more respective usage schedules. Each of the operating profiles may have characteristics to support a particular type, or types, of communication. For example, an operating profile may be an enhanced mobile broad band profile (e.g., for providing enhanced broadband access in dense areas, ultra-high bandwidth access in dense areas, broadband access in public transport systems, and/or the like); a massive machine-type communication profile (e.g., for providing automatic data generation, exchange, processing, and actuation among intelligent machines); a connected vehicles profile (e.g., for providing vehicle-to-everything (V2X) communications, such as vehicle-to-vehicle (V2V) communications, vehicle-to-infrastructure (V2I) communications, vehicle-to-network (V2N) communications, and vehicle-to-pedestrian (V2P) communications, and/or the like); an enhanced multi-media profile (e.g., for providing broadcast services, on demand and live TV, mobile TV, augmented reality (AR), virtual reality (VR), and/or the like); an internet of things profile (e.g., for providing metering, lighting management in buildings and cities, environmental monitoring, traffic control, and/or the like); an ultra-reliable low latency communication profile (e.g., for providing process automation, automated factories, tactile interaction, emergency communications, urgent healthcare, and/or the like); a fixed wireless access profile (e.g., for providing localized network access and/or the like); and/or the like. Furthermore, the one or more operating profiles may include numerous variations of each kind of operating profile. For example, the one or more operating profiles may include a first connected vehicles profile (e.g., to support V2X communications), a second connected vehicles profile (e.g., to support V2V communications), a third connected vehicles profile (e.g., to support V2I communications), a fourth connected vehicles profile (e.g., to support V2N communications), a fifth connected vehicles profile (e.g., to support V2P communications), and/or the like. The one or more respective usage schedules may indicate when (e.g., a period of time) the one or more or more operating profiles are to be applied (e.g., by a dSON 104 in the at least one cluster).

In some implementations, the cSON 108 may generate the one or more operating profiles and/or the one or more respective usage schedules based on the configuration parameters. For example, when the configuration parameters include a high data rate requirement (e.g., download and upload speeds for a user device greater than a threshold, such as 50 Mbps), the cSON 108 may generate an enhanced mobile broad band profile, an enhanced multi-media profile, and/or the like. In another example, when the configuration parameters include a low latency performance requirement (e.g., an end-to-end communications transmission time for a user device less than or equal to a threshold, such as about 10 ms), the cSON 108 may generate an ultra-reliable low latency communication profile, a massive machine-type communication profile, and/or the like. The cSON 108 may generate the one or more operating profiles and/or the one or more respective usage schedules to optimize spectral assets of a base station (e.g., base station 102), a cluster, and/or the wireless telecommunications network.

In some implementations, the cSON 108 may generate the one or more operating profiles and/or the one or more respective usage schedules using a machine learning model. In some implementations, the cSON 108 may generate and/or train the machine learning model to generate an operating profile and/or a usage schedule for the operating profile. For example, the cSON 108 may obtain (e.g., from a data structure) and process historical information (e.g., historical information concerning one or more operating profiles and/or one or more respective usage schedules); historical performance information concerning one or more dSONs 104 (e.g., historical performance information concerning each dSON 104 that has applied an operating profile (e.g., according to a respective usage schedule)); historical performance information concerning one or more base stations 102 (e.g., historical information concerning each base station 102 controlled by a dSON 104 that has applied an operating profile (e.g., according to a respective usage schedule)); and/or the like to generate an operating profile and/or a usage schedule for the operating profile.

In some implementations, the cSON 108 may perform a set of data manipulation procedures to pre-process the historical information to generate the machine learning model. The cSON 108 may use a data pre-processing procedure, a model training procedure, a model verification procedure, and/or the like to pre-process the historical information to generate pre-processed historical information. For example, the cSON 108 may pre-process the historical information to remove irrelevant information, confidential data, corrupt data, and/or the like. In this way, the cSON 108 may organize thousands, millions, or billions of data entries for machine learning and model generation.

In some implementations, the cSON 108 may perform a training operation when generating the machine learning model. For example, the cSON 108 may portion the historical information into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, a minimum feature set may be created from pre-processing and/or dimensionality reduction of the historical information. In some implementations, the cSON 108 may train the machine learning model on this minimum feature set, thereby reducing processing required to train the machine learning model, and may apply a classification technique to the minimum feature set.

When training the machine learning model, the cSON 108 may utilize a random forest classifier technique to train the machine learning model. For example, the cSON 108 may utilize a random forest classifier technique to construct multiple decision trees during training and may output a classification of the historical information. As another example, the cSON 108 may utilize a random forest regression technique to construct multiple decision trees during training and may output a numeric predication associated with the historical information. Additionally, or alternatively, when training the machine learning model, the cSON 108 may utilize one or more gradient boosting techniques to generate the machine learning model. For example, the cSON 108 may utilize an xgboost classifier technique, an xgboost regression technique, a gradient boosting machine (GBM) technique, a gradient boosting tree, and/or the like to generate a prediction model from a set of weak prediction models.

When training the machine learning model, the cSON 108 may utilize a logistic regression technique to train the machine learning model. For example, the cSON 108 may utilize a binary classification of the historical information (e.g., whether the historical information is indicative of a particular accurate prediction), a multi-class classification of the historical information (e.g., whether the historical information is indicative of one or more accurate predictions), and/or the like to train the machine learning model. Additionally, or alternatively, when training the machine learning model, the cSON 108 may utilize a naïve Bayes classifier technique to train the machine learning model. For example, the behavioral analytics platform may utilize binary recursive partitioning to divide the historical information into various binary categories (e.g., starting with whether the historical information is indicative of a particular accurate prediction). Based on using recursive partitioning, the cSON 108 may reduce utilization of computing resources relative to manual, linear sorting and analysis of data points, thereby enabling use of thousands, millions, or billions of data points to train a machine learning model, which may result in a more accurate machine learning model than using fewer data points.

Additionally, or alternatively, when training the machine learning model, the cSON 108 may utilize a support vector machine (SVM) classifier technique. For example, the cSON 108 may utilize a linear model to implement non-linear class boundaries, such as via a max margin hyperplane. Additionally, or alternatively, when utilizing the SVM classifier technique, the cSON 108 may utilize a binary classifier to perform a multi-class classification. Use of an SVM classifier technique may reduce or eliminate overfitting, may increase a robustness of the machine learning model to noise, and/or the like.

In some implementations, the cSON 108 may train the machine learning model using a supervised training procedure. In some implementations, the cSON 108 may receive additional input to the machine learning model from other sources. In some implementations, the cSON 108 may use one or more other model training techniques, such as a neural network technique, and/or the like. For example, the cSON 108 may perform a multi-layer artificial neural network processing technique (e.g., using a recurrent neural network architecture, a two-layer feedforward neural network architecture, a three-layer feedforward neural network architecture, and/or the like) to perform pattern recognition with regard to patterns in the historical information. Use of artificial neural network processing technique may improve an accuracy of a supervised learning model generated by the cSON 108 by being more robust to noisy, imprecise, or incomplete data, and by enabling the cSON 108 to detect patterns and/or trends undetectable to human analysts or systems using less complex techniques. Furthermore, when using a recurrent neural network architecture, long short-term memory (LSTM) may be employed to classify, make predictions, and/or otherwise process time-series data, which may be useful to predict how patterns change over time (e.g., over a month, a year, and/or the like).

In some implementations, a different device, such as a server device, may generate and/or train the machine learning model. The cSON 108 may obtain the machine learning model from the different device. For example, the different device may send the machine learning model to the cSON 108 and/or the cSON 108 may request and receive the machine learning model from the different device. In some implementations, the different device may update and send (e.g., on a scheduled basis, on an on-demand basis, on a triggered basis, and/or the like) the machine learning model to the cSON 108. The cSON 108 may obtain the updated machine learning model from the different device.

In this way, the cSON 108 may use artificial intelligence techniques, machine learning techniques, deep learning techniques, and/or the like to determine one or more associations between historical information and a determination indicating an operating profile and a usage schedule for the operating profile.

As shown by reference number 116, the cSON 108 may send the configuration parameters, the one or more operating profiles, and/or the one or more respective usage schedules to the mSON 106.

Figure 1C:
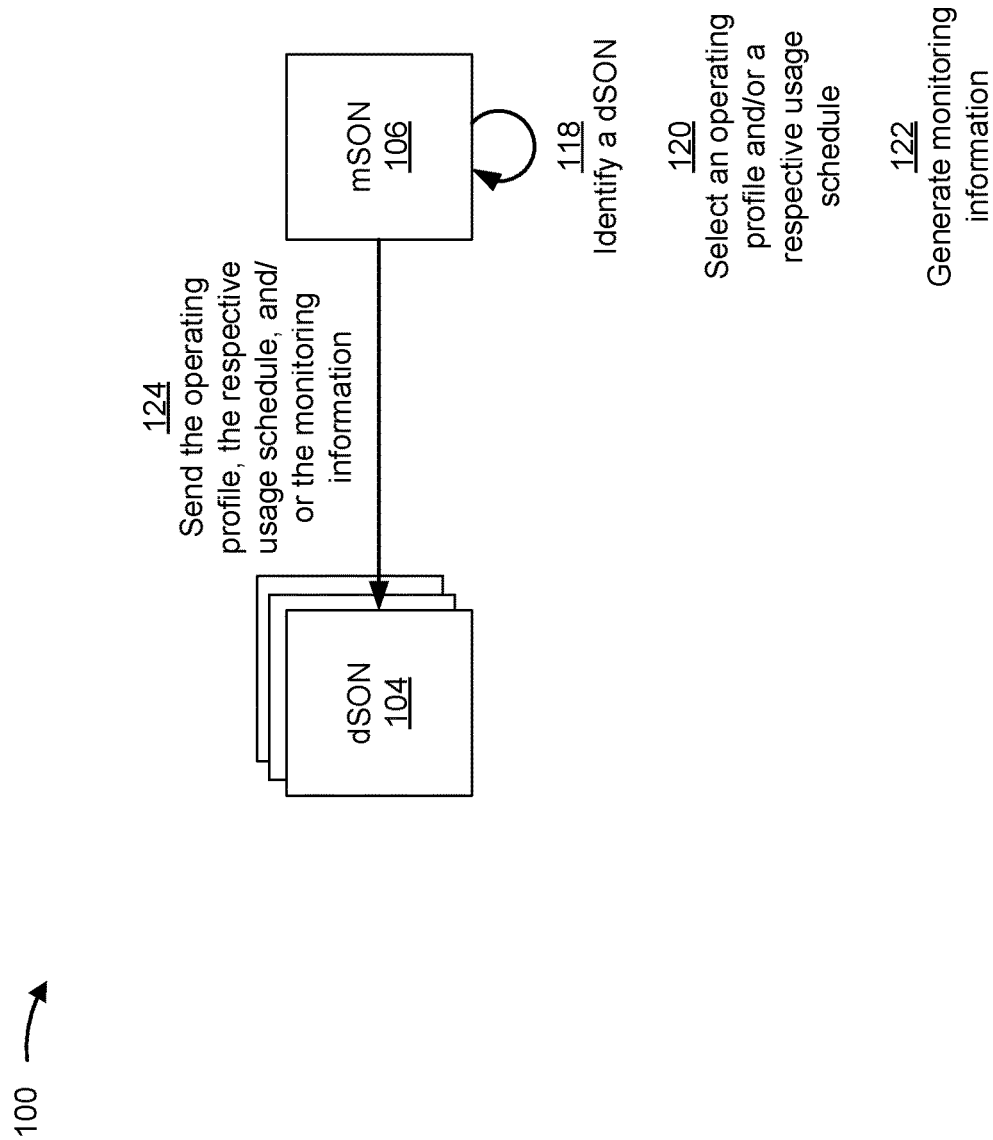

As shown in FIG. 1C and by reference number 118, the mSON 106 may identify a dSON 104, of the one or more dSONs 104, associated with the at least one cluster. For example, the configuration parameters may include information indicating the one or more dSONs 104 and/or one or more base stations 102 that are included in the at least one cluster, and the mSON 106 may process the configuration parameters to identify the dSON 104.

As shown by reference number 120, the mSON 106 may select, based on identifying the dSON, an operating profile, of the one or more operating profiles, and/or a respective usage schedule of the one or more usage schedules (e.g., an operating profile to be applied by the dSON 104 according to the respective usage schedule). In some implementations, the mSON 106 may obtain capability information concerning at least one capability (e.g., a data rate capability, a density capability, a latency performance capability, a mobility capability, and/or the like) of a base station 102 associated with the dSON 104, and may select the operating profile and/or the respective usage schedule based on the capability information. For example, the mSON 106 may select an enhanced mobile broad band profile when the base station 102 has a high data rate capability, may select an ultra-reliable low latency communication profile when the base station 102 has a low latency performance capability, may select a massive machine-type communication profile when the base station 102 has a high connection density capability, and/or the like.

Additionally, or alternatively, the mSON 106 may obtain information concerning at least one performance indicator of the base station 102 (e.g., obtain real-time information concerning a performance of the base station 102) and may select the operating profile and/or the respective usage schedule based on the at least one performance indicator. The at least one performance indicator may include a data rate indicator (e.g., download and upload bitrates provided by the base station 102); a connection density indicator (e.g., a number of communication sessions provided by the base station 102); a latency indicator (e.g., an end-to-end communications transmission time provided by the base station 102); a reliability indicator (e.g., a percentage of packets successfully transmitted between a user device and a network via the base station 102); and/or the like.

As shown by reference number 122, the mSON 106 may generate, based on the configuration parameters, monitoring information. The monitoring information may identify at least one performance indicator, of the one or more performance indicators, of the base station 102 that the dSON 104 is to monitor (e.g., to determine a performance of the base station 102). The monitoring information may indicate criteria for monitoring the at least one performance indicator.

As shown by reference number 124, the mSON 106 may send the operating profile, the respective usage schedule, and/or the monitoring information to the dSON 104.

Figure 1D:
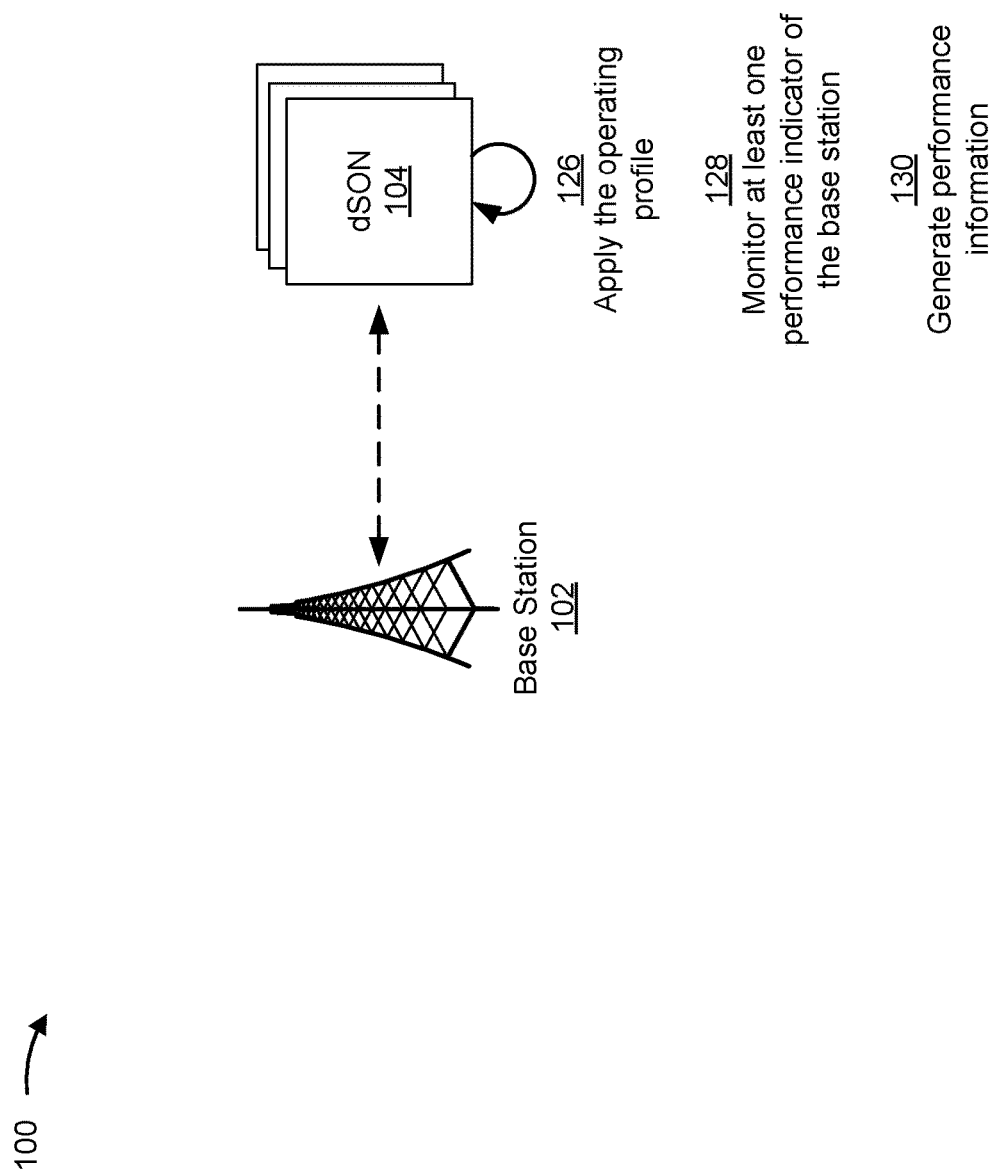

As shown in FIG. 1D and by reference number 126, the dSON 104 may apply the operating profile (e.g., to control operation of the base station 102 associated with the dSON 104). In some implementations (e.g., when the mSON 106 sends the operating profile but not the respective usage schedule), the dSON 104 may cause the base station 102 to operate according to the operating profile upon receiving the operating profile. Additionally, or alternatively (e.g., when the mSON 106 sends the operating profile and the respective usage schedule), the dSON 104 may apply the operating profile according to the respective usage schedule. For example, the dSON 104 may determine, based on the respective usage schedule, a period of time in which to apply the operating profile and may cause the base station 102 to operate according to the operating profile during the period of time.

As shown by reference number 128, the dSON 104 may monitor at least one performance indicator of the base station 102 (e.g., based on the monitoring information). As shown by reference number 130, the dSON 104 may generate performance information based on monitoring the at least one performance indicator. In some implementations, the dSON 104 may identify, based on the monitoring information, a threshold associated with the at least one performance indicator and may determine whether the at least one performance indicator satisfies the threshold. Accordingly, the dSON 104 may generate performance information that indicates a number of times that the at least one performance indicator satisfied the threshold (e.g., within a particular period of time), an amount of time that the at least one performance indicator satisfied the threshold, and/or the like.

For example, the monitoring information may indicate that the dSON 104 is to determine whether a connection density indicator of the base station 102 satisfies (e.g., is greater than or equal to) a connection density threshold (e.g., a number of communication sessions that the base station 102 can provide while maintaining consistent quality of service (QoS)). Accordingly, based on monitoring the connection density indicator, the dSON 104 may generate performance information that indicates a number of times that the connection density threshold was satisfied and an amount of time that the connection density threshold was satisfied.

Figure 1E:
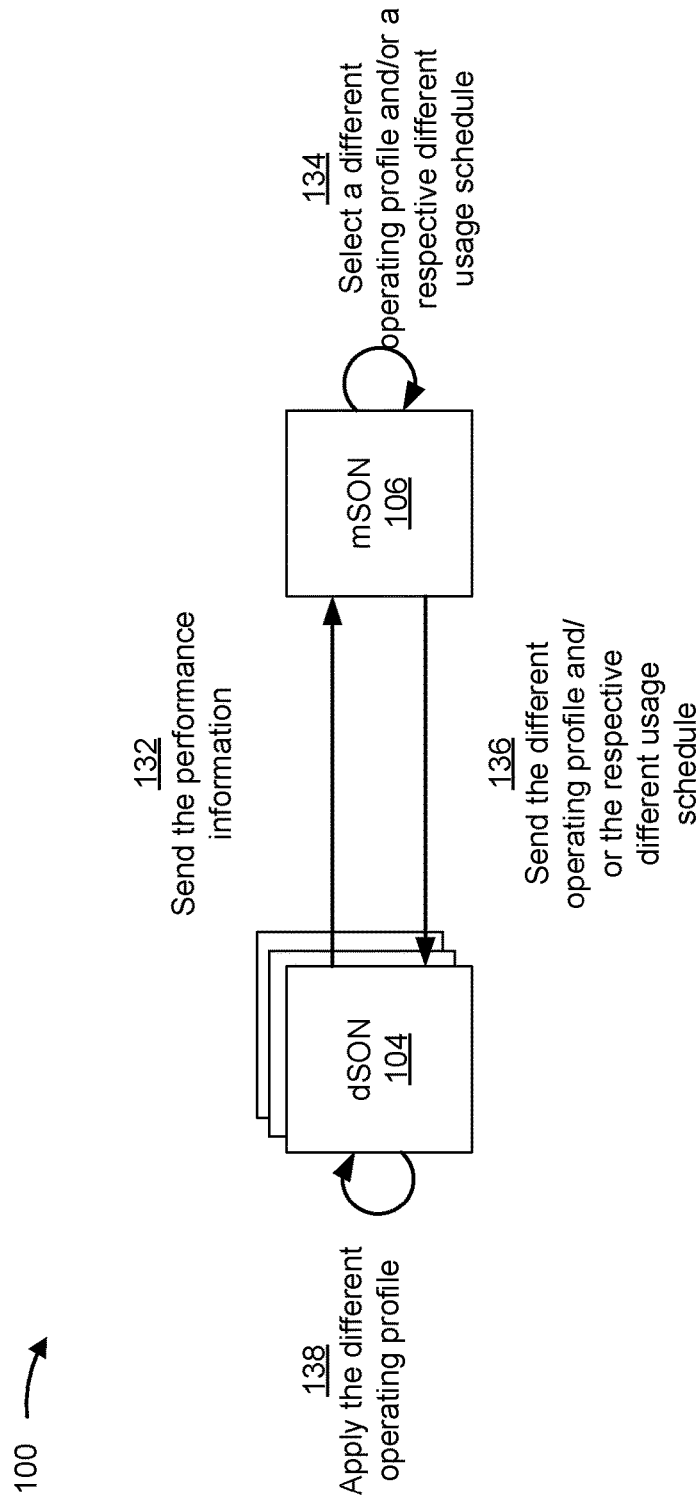

As shown in FIG. 1E and by reference number 132, the dSON 104 may send the performance information to the mSON 106. The dSON 104 may send the performance information on a triggered basis (e.g., when the at least one performance indicator satisfies the threshold), on a scheduled basis (e.g., every minute, every 5 minutes, every hour, every day, and/or the like), on an on-demand basis (e.g., based on receiving a request for the performance information from the mSON 106), and/or the like.

In some implementations, the mSON 106 may process the performance information to determine a performance of the base station 102 associated with the dSON 104. The mSON 106 may determine, based on the performance of the base station 102, that the base station 102 is not operating optimally. Accordingly, the mSON 106 may cause the dSON 104 to shut down (e.g., to conserve resources of the dSON 104). Additionally, or alternatively, as shown by reference number 134, the mSON 106 may select a different operating profile and/or a respective different usage schedule (e.g., to be applied by the dSON 104 to improve the performance of the base station 102). For example, the mSON 106 may determine, based on the performance of the base station 102, that the base station 102 is primarily supporting communication sessions for IoT devices, rather than media consuming user devices. The mSON 106 may therefore determine that an enhanced mobile broad band profile is no longer appropriate and may select an internet of things profile and/or an associated usage schedule. In another example, the mSON 106 may determine, based on the performance of the base station 102, that the base station 102 is primarily supporting high mobility user devices (e.g., where a user device is moving at a rate of speed that satisfies (e.g., is greater than an or equal to) a threshold, such as 40 miles per hour (e.g., which may indicate that the user device is associated with travel on a highway)) and may select a high mobility profile and/or an associated usage schedule. The mSON 106 may select the high mobility profile from a set of mobility profiles (e.g., that may include a low mobility profile (e.g., for user devices moving at a low rate of speed (e.g., less than 10 miles per hour)), a moderate mobility profile (e.g., for user devices moving at a moderate rate of speed (e.g., greater than or equal to 10 miles per hour and/or less than 40 miles per hour)), a high mobility profile (e.g., for user device moving at a high rate of speed (e.g., greater than or equal to 40 miles per hour)), and/or the like) that were sent as part of the one or more operating profiles by the cSON 108 to the mSON 106 (e.g., as described herein in relation to reference number 116).

Additionally, or alternatively, the mSON 106 may receive, from one or more additional dSONs 104 in the at least one cluster, additional performance information concerning the one or more additional dSONs 104. The mSON 106 may determine a performance of the cluster based on the performance information concerning the dSON 104 and the additional performance information concerning the one or more additional dSONs 104 and may select, based on the performance of the cluster, a different operating profile, of the one or more operating profiles, and/or a respective different usage schedule of the one or more usage schedules. For example, the mSON 106 may determine, based on the performance of the cluster, that the cluster is not providing enough support for massive machine-type communications and may select a massive machine-type communication profile and/or an associated usage schedule.

As shown by reference number 136, the mSON 106 may send the different operating profile and/or the respective different usage schedule to the dSON 104. As shown by reference number 138, the dSON 104 may apply the different operating profile in a similar manner as described herein in relation to FIG. 1D. For example, the dSON 104 may apply the different operating profile upon receiving the operating profile. As another example, the dSON 104 may apply the different operating profile according to the respective different usage schedule. In some implementations, the dSON 104 may monitor, after applying the different profile, the at least one performance indicator of the base station 102 based on the monitoring information, and may generate additional performance information in a similar manner as described herein in relation to FIG. 1D. In some implementations, the dSON 104 may send the additional performance information to the mSON 106 and the mSON 106 may process the additional performance information in a similar manner as described herein.

Figure 1F:
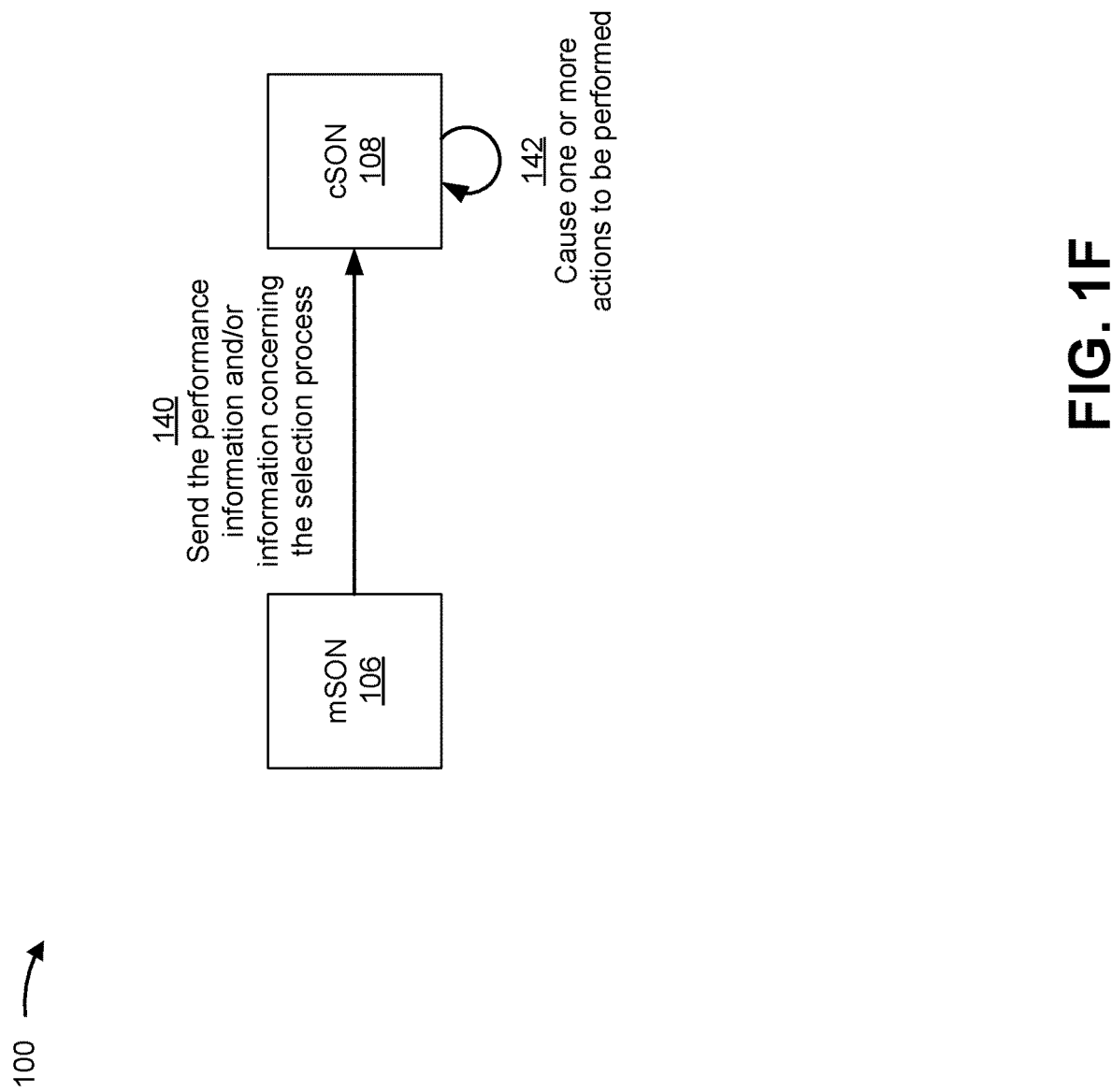

As shown in FIG. 1F and by reference number 140, the mSON 106 may send the performance information to the cSON 108. As shown by reference number 142, the cSON 108 may process the performance information and may cause one or more actions to be performed. For example, cSON 108 may update the machine learning model (e.g., that generates the one or more operating profiles and the one or more respective usage schedules) based on the performance information.

In another example, the cSON 108 may generate one or more instructions to control at least one antenna of the base station 102 (e.g., the base station 102 associated with the dSON 104). The one or more instructions may include a set of instructions to control a tilt angle of the at least one antenna. The one or more instructions may also include a set of instructions for the mSON 106 to determine a beam shape and/or a beam direction of at least one beam associated with the at least one antenna. The cSON 108 may send the one or more instructions to the mSON 106, which may process the one or more instructions and/or the performance information (e.g., of the base station 102 associated with the dSON 104) to determine a set of instructions to control the beam shape and/or the beam direction of the at least one beam associated with the at least one antenna. The mSON 106 may send the set of instructions to control the tilt angle of the at least one antenna and/or the set of instructions to control the beam shape and/or the beam direction of the at least one beam associated with the at least one antenna to the dSON 104, which, when executed by the dSON 104, may cause the tilt angle of the at least one antenna to adjust and/or the beam shape and/or the beam direction of the at least one beam to adjust.

The number and arrangement of devices and networks shown in FIGS. 1A-1F are provided as one or more examples. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of example implementation 100 may perform one or more functions described as being performed by another set of devices of example implementation 100.

Figure 2:
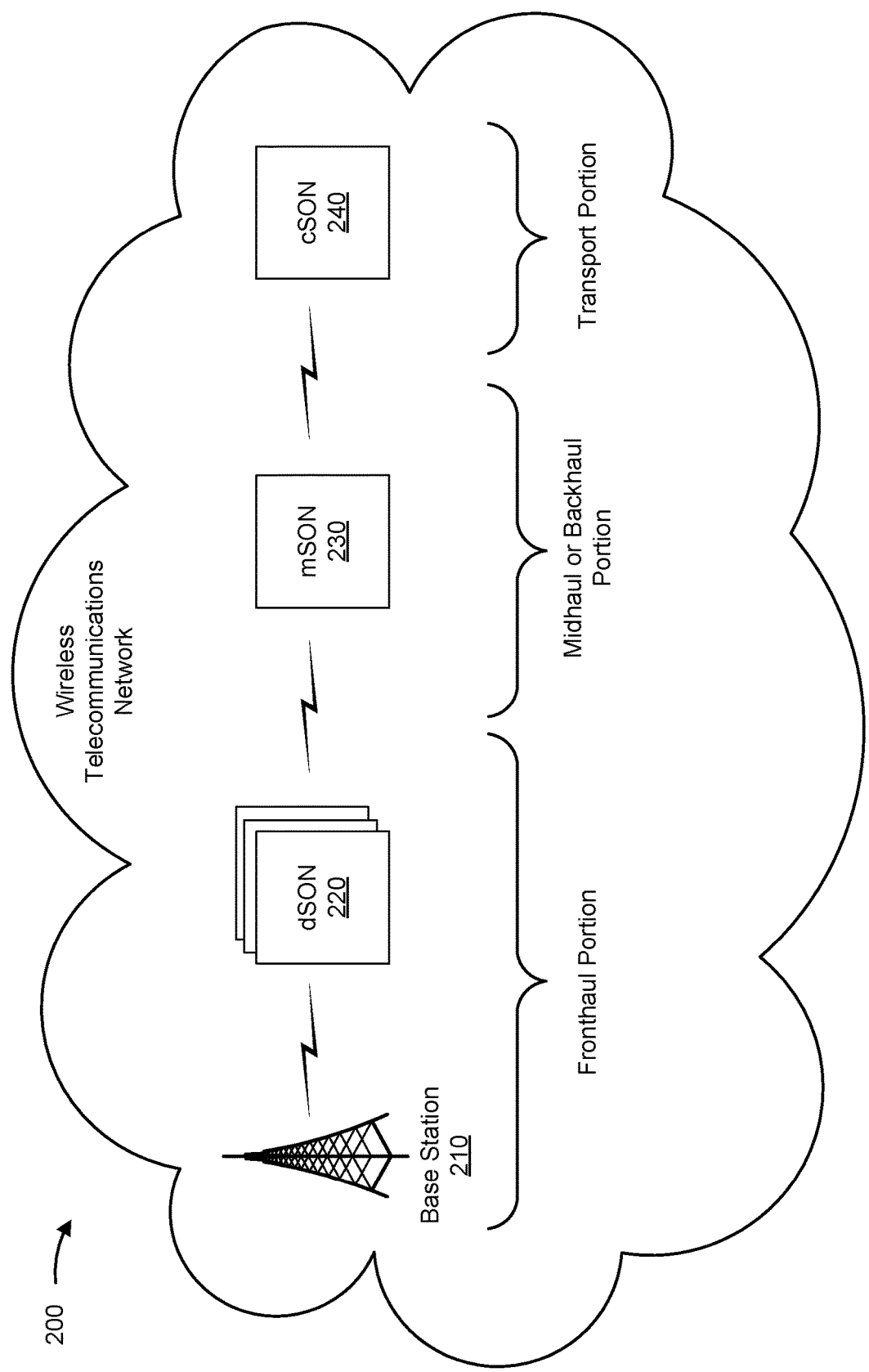
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a base station 210, a dSON 220, an mSON 230, and a cSON 240. Devices of environment 200 may interconnect via wired connections, wireless connections, optical communications or a combination of wired, optical, and wireless connections. Some implementations may be performed in association with a wireless telecommunications network, such as a third generation (3G) network, a fourth generation (4G) network, a long term evolution (LTE) network, a fifth generation (5G) network, and/or the like.

Base station 210 includes one or more devices capable of communicating with one or more user devices (not shown) using a Radio Access Technology (RAT). For example, base station 210 may include a base transceiver station, a radio base station, a node B, an evolved node B (eNB), a gNB, a base station subsystem, a cellular site, a cellular tower (e.g., a cell phone tower, a mobile phone tower), an access point, a transmit receive point (TRP), a radio access node, a macrocell base station, a microcell base station, a picocell base station, a femtocell base station, or a similar type of device. Base station 210 may transfer traffic between a user device (e.g., using a cellular RAT), other base stations 210 (e.g., using a wireless interface or a backhaul interface, such as a wired backhaul interface), and/or a network. Base station 210 may provide one or more cells that cover geographic areas. Some base stations 210 may be mobile base stations. Some base stations 210 may be capable of communicating using multiple RATs.

In some implementations, base station 210 may perform scheduling and/or resource management for user devices covered by base station 210 (e.g., user devices covered by a cell provided by base station 210). In some implementations, base stations 210 may be controlled or coordinated by a network controller, which may perform load balancing, network-level configuration, and/or the like. The network controller may communicate with base stations 210 via a wireless, optical, or wireline backhaul. In some implementations, base station 210 may include a network controller, a self-organizing network (SON) module or component (e.g., dSON 220), or a similar module or component. Base station 210 may be associated with a fronthaul portion of the wireless telecommunications network.

dSON 220 is implemented by one or more devices (e.g., a server device, a group of server devices, a desktop computer, a laptop computer, and/or a similar type of device). In some implementations, dSON 220 may be a software implementation of a machine (e.g., a computer) that executes programs like a physical machine. dSON 220 may be either a system virtual machine or a process virtual machine, depending upon use and degree of correspondence to any real machine by dSON 220. A system virtual machine may provide a complete system platform that supports execution of a complete operating system. A process virtual machine may execute a single program, and may support a single process. In some implementations, dSON 220 may be implemented by one or more devices that include a communication interface that allows dSON 220 to receive information from and/or transmit information to mSON 230. dSON 220 may be associated with a fronthaul portion of the wireless telecommunications network.

mSON 230 is implemented by one or more devices (e.g., a server device, a group of server devices, a desktop computer, a laptop computer, and/or a similar type of device). In some implementations, mSON 230 may be a software implementation of a machine (e.g., a computer) that executes programs like a physical machine. mSON 230 may be either a system virtual machine or a process virtual machine, depending upon use and degree of correspondence to any real machine by mSON 230. In some implementations, mSON 230 may be implemented by one or more devices that include a communication interface that allows mSON 230 to receive information from and/or transmit information to dSON 220 and/or cSON 240. mSON 230 may be associated with a midhaul portion of the wireless telecommunications network.

cSON 240 is implemented by one or more devices (e.g., a server device, a group of server devices, a desktop computer, a laptop computer, and/or a similar type of device). In some implementations, cSON 240 may be a software implementation of a machine (e.g., a computer) that executes programs like a physical machine. cSON 240 may be either a system virtual machine or a process virtual machine, depending upon use and degree of correspondence to any real machine by cSON 240. In some implementations, cSON 240 may be implemented by one or more devices that include a communication interface that allows cSON 240 to receive information from and/or transmit information to mSON 230. cSON 240 may be associated with a backhaul portion of the wireless telecommunications network.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
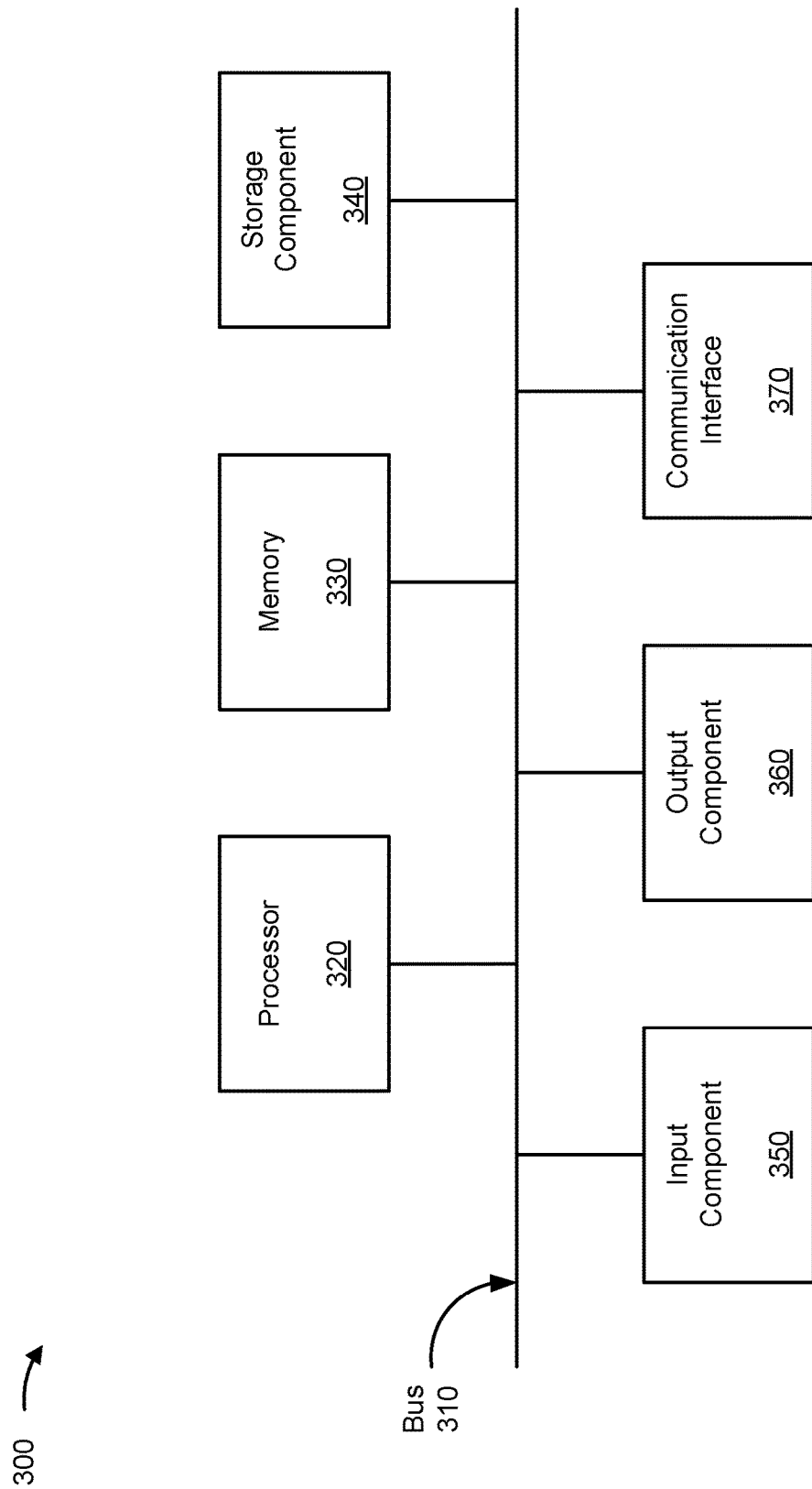
FIG. 3 is a diagram of example components of one or more devices of FIG. 2.

FIG. 3 is a diagram of example components of a device 300. Device 300 may correspond to base station 210, dSON 220, mSON 230, and/or cSON 240. In some implementations base station 210, dSON 220, mSON 230, and/or cSON 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
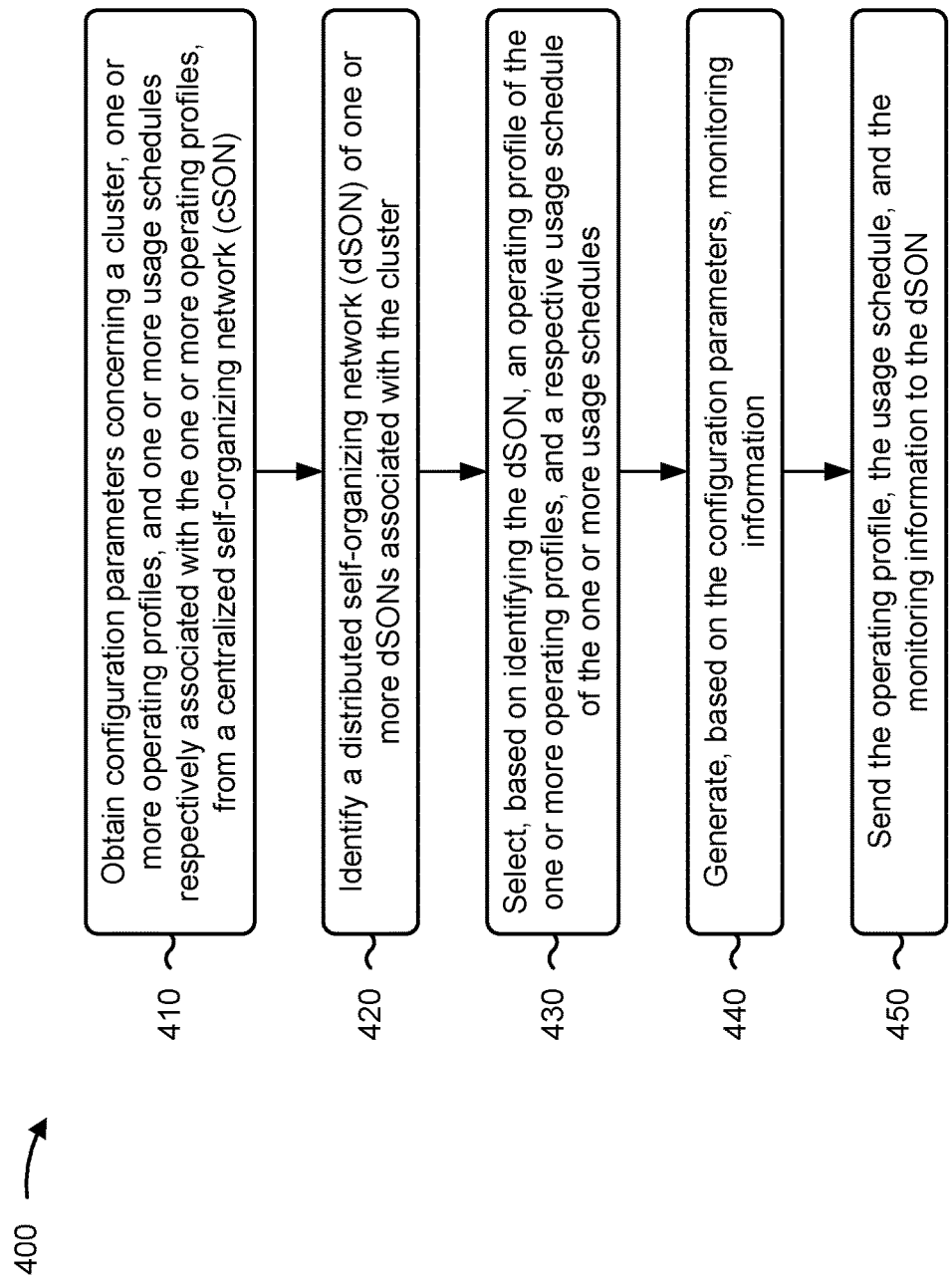
FIGS. 4-6 are flow charts of example processes concerning a multi-tier self-organizing network architecture.

FIG. 4 is a flow chart of an example process 400 concerning a multi-tier self-organizing network architecture. In some implementations, one or more process blocks of FIG. 4 may be performed by an mSON (e.g., mSON 106 and/or mSON 230). In some implementations, one or more process blocks of FIG. 4 may be performed by another device or a group of devices separate from or including the mSON, such as a baseband centralized unit of a wireless telecommunications network, and/or the like.

As shown in FIG. 4, process 400 may include obtaining configuration parameters concerning a cluster, one or more operating profiles, and one or more usage schedules respectively associated with the one or more operating profiles, from a cSON (block 410). For example, the mSON (e.g., using processor 320, memory 330, storage component 340, input component 350, output component 360, communication interface 370, and/or the like) may obtain configuration parameters concerning a cluster, one or more operating profiles, and one or more usage schedules respectively associated with the one or more operating profiles, from a cSON, as described above.

As further shown in FIG. 4, process 400 may include identifying a dSON of one or more dSONs associated with the cluster (block 420). For example, the mSON (e.g., using processor 320, memory 330, storage component 340, input component 350, output component 360, communication interface 370, and/or the like) may identify a dSON of one or more dSONs associated with the cluster, as described above.

As further shown in FIG. 4, process 400 may include selecting, based on identifying the dSON, an operating profile of the one or more operating profiles, and a respective usage schedule of the one or more usage schedules (block 430). For example, the mSON (e.g., using processor 320, memory 330, storage component 340, input component 350, output component 360, communication interface 370, and/or the like) may select, based on identifying the dSON, an operating profile of the one or more operating profiles, and a respective usage schedule of the one or more usage schedules, as described above. When selecting the operating profile and the respective usage schedule, the mSON may obtain information concerning at least one performance indicator of a base station associated with the dSON; and may select the operating profile and the respective usage schedule based on the at least one performance indicator. The at least one performance indicator may be a data rate indicator, a connection density indicator, a latency indicator, a reliability indicator, and/or the like.

As further shown in FIG. 4, process 400 may include generating, based on the configuration parameters, monitoring information (block 440). For example, the mSON (e.g., using processor 320, memory 330, storage component 340, input component 350, output component 360, communication interface 370, and/or the like) may generate, based on the configuration parameters, monitoring information, as described above. When generating the monitoring information, the mSON may identify a base station associated with the dSON; may determine at least one capability of the base station; and may generate, based on the configuration parameters, monitoring instructions that concern the at least one capability. In some implementations, the monitoring information may identify one or more performance indicators of a base station associated with monitoring the dSON.

As further shown in FIG. 4, process 400 may include sending the operating profile, the usage schedule, and the monitoring information to the dSON (block 450). For example, the mSON (e.g., using processor 320, memory 330, storage component 340, input component 350, output component 360, communication interface 370, and/or the like) may send the operating profile, the usage schedule, and the monitoring information to the dSON, as described above.

Process 400 may include additional implementations, such as any single implementation or any combination of implementations described below and/or in connection with one or more other processes described elsewhere herein.

For example, the mSON may receive, from the dSON performance information concerning the dSON. In some implementations, the mSON may cause, based on the performance information concerning the dSON, the dSON to shut down (e.g., for a period of time). In some implementations, the mSON may select, based on the performance information, a different operating profile, of the one or more operating profiles, and a respective different usage schedule of the one or more usage schedules; and may send the selected operating profile and the selected usage schedule to the dSON. The mSON may send the performance information to the cSON to permit the cSON to update a machine learning model associated with generating operating profiles and usage schedules.

In some implementations, the mSON may receive, from the dSON, after sending the operating profile, the usage schedule, and the monitoring information to the dSON, performance information concerning the dSON; may receive, from one or more additional dSONs in the cluster, additional performance information concerning the one or more additional dSONs; may determine a performance of the cluster based on the performance information concerning the dSON and the additional performance information concerning the one or more additional dSONs; may select, based on the performance of the cluster, a different operating profile, of the one or more operating profiles, and a respective different usage schedule of the one or more usage schedules; and may send the different operating profile and the different usage schedule to the dSON.

In some implementations, an end-to-end transmission time for communications between the dSON and the mSON is less than an end-to-end transmission time for communications between the dSON and the cSON.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
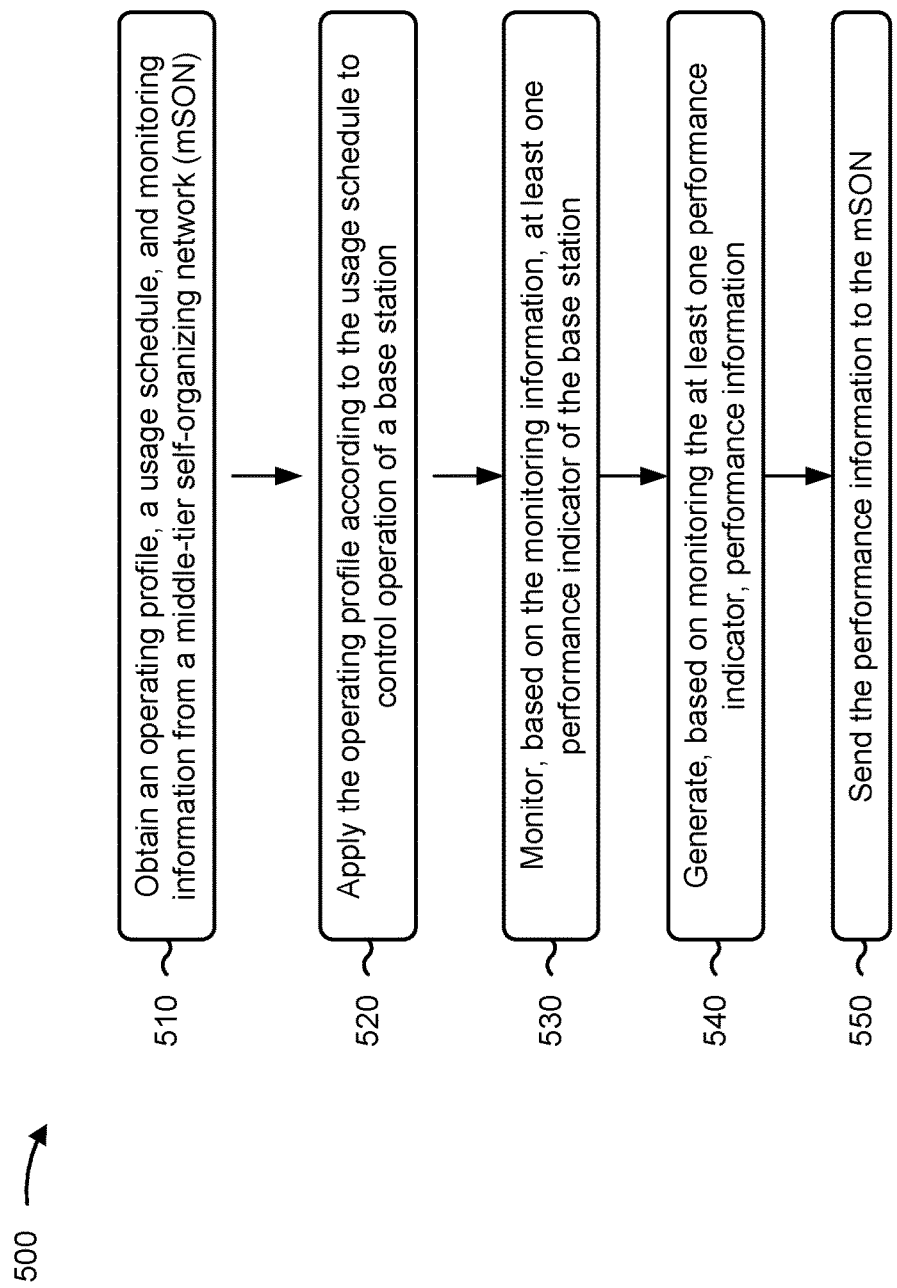

FIG. 5 is a flow chart of an example process 500 concerning a multi-tier self-organizing network architecture. In some implementations, one or more process blocks of FIG. 5 may be performed by a dSON (e.g., dSON 104 and/or dSON 220). In some implementations, one or more process blocks of FIG. 5 may be performed by another device or a group of devices separate from or including the dSON, such as a baseband distributed unit of a wireless telecommunications network, and/or the like.

As shown in FIG. 5, process 500 may include obtaining an operating profile, a usage schedule, and monitoring information from an mSON (block 510). For example, the dSON (e.g., using processor 320, memory 330, storage component 340, input component 350, output component 360, communication interface 370, and/or the like) may obtain an operating profile, a usage schedule, and monitoring information from an mSON, as described above. The operating profile may be an enhanced mobile broad band profile, a massive machine-type communication profile, a connected vehicles profile, an enhanced multi-media profile, an internet of things profile, an ultra-reliable low latency communication profile, a fixed wireless access profile, and/or the like.

As further shown in FIG. 5, process 500 may include applying the operating profile according to the usage schedule to control operation of a base station (block 520). For example, the dSON (e.g., using processor 320, memory 330, storage component 340, input component 350, output component 360, communication interface 370, and/or the like) may apply the operating profile according to the usage schedule to control operation of a base station as described above. The base station may be associated with the dSON. When applying the operating profile according to the usage schedule, the dSON may determine, based on the usage schedule, a period of time in which to apply the operating profile and may cause the base station to operate according to the operating profile during the period of time.

As further shown in FIG. 5, process 500 may include monitoring, based on the monitoring information, at least one performance indicator of the base station (block 530). For example, the dSON (e.g., using processor 320, memory 330, storage component 340, input component 350, output component 360, communication interface 370, and/or the like) may monitor, based on the monitoring information, at least one performance indicator of the base station, as described above. When monitoring the at least one performance indicator of the base station, the dSON may identify, based on the monitoring information, a threshold associated with the at least one performance indicator and may determine whether the at least one performance indicator satisfies the threshold.

As further shown in FIG. 5, process 500 may include generating, based on monitoring the at least one performance indicator, performance information (block 540). For example, the dSON (e.g., using processor 320, memory 330, storage component 340, input component 350, output component 360, communication interface 370, and/or the like) may generate, based on monitoring the at least one performance indicator, performance information, as described above. The performance information may include a number of times that the at least one performance indicator satisfied a threshold, an amount of time that the at least one performance indicator satisfied the threshold, and/or the like.

As further shown in FIG. 5, process 500 may include sending the performance information to the mSON (block 550). For example, the dSON (e.g., using processor 320, memory 330, storage component 340, input component 350, output component 360, communication interface 370, and/or the like) may send the performance information to the mSON, as described above.

Process 500 may include additional implementations, such as any single implementation or any combination of implementations described below and/or in connection with one or more other processes described elsewhere herein.

For example, the dSON may obtain, after sending the performance information to the mSON, a different operating profile and a different usage schedule, and may apply the different profile according to the different usage schedule. The dSON may monitor, after applying the different profile according to the different usage schedule, and based on the monitoring information, the at least one performance indicator of the base station; may generate, based on monitoring the at least one performance indicator after applying the different profile according to the different usage schedule, additional performance information; and may send the additional performance information to the mSON.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
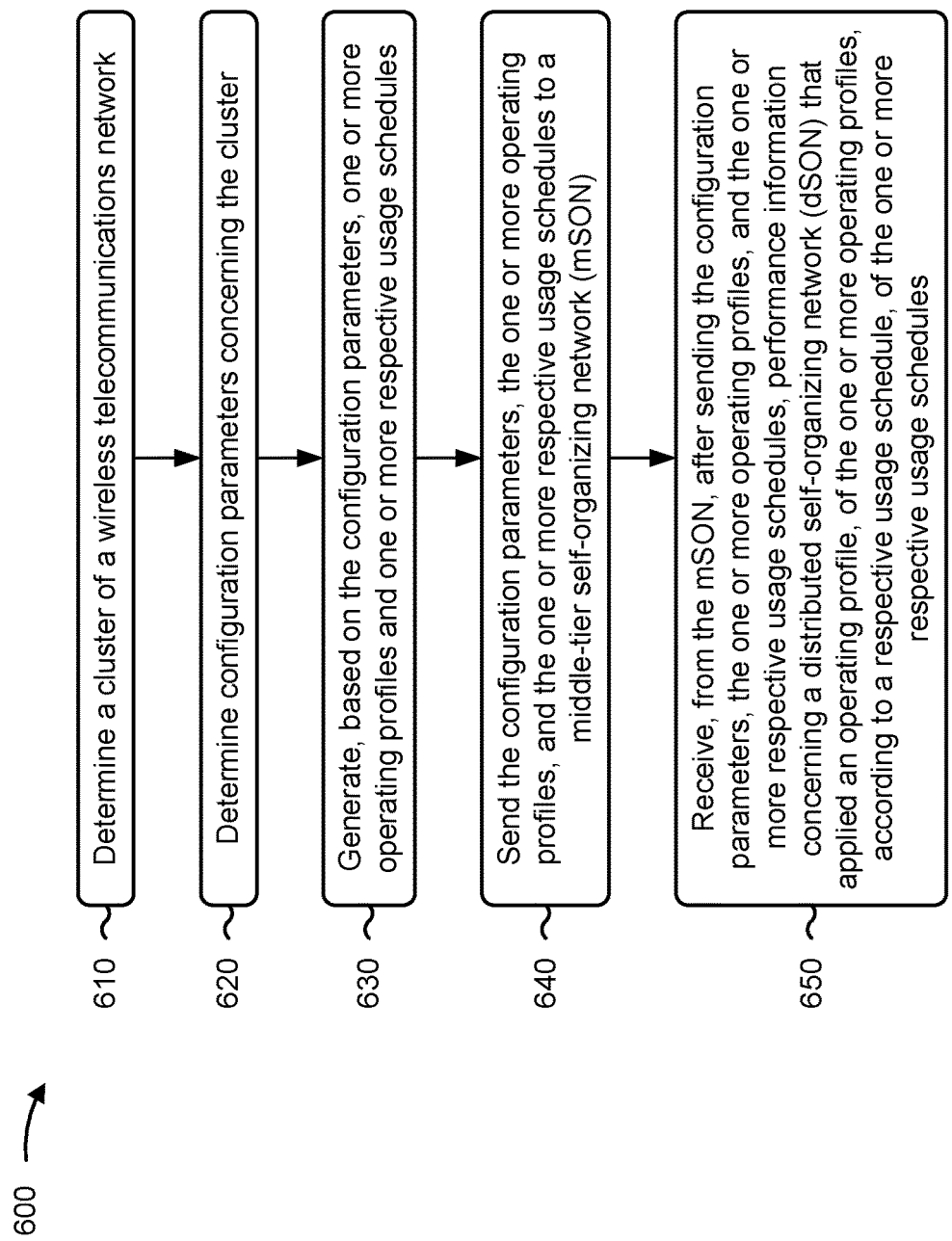

FIG. 6 is a flow chart of an example process 600 concerning a multi-tier self-organizing network architecture. In some implementations, one or more process blocks of FIG. 6 may be performed by a cSON (e.g., cSON 108 and/or cSON 240). In some implementations, one or more process blocks of FIG. 6 may be performed by another device or a group of devices separate from or including the cSON, such as a device associated with a network management system of the wireless telecommunications network, and/or the like.

As shown in FIG. 6, process 600 may include determining a cluster of a wireless telecommunications network (block 610). For example, the cSON (e.g., using processor 320, memory 330, storage component 340, input component 350, output component 360, communication interface 370, and/or the like) may determine a cluster of a wireless telecommunications network, as described above. The cluster may include one or more dSONs and one or more base stations.

As further shown in FIG. 6, process 600 may include determining configuration parameters concerning the cluster (block 620). For example, the cSON (e.g., using processor 320, memory 330, storage component 340, input component 350, output component 360, communication interface 370, and/or the like) may determine configuration parameters concerning the cluster, as described above.

As further shown in FIG. 6, process 600 may include generating, based on the configuration parameters, one or more operating profiles and one or more respective usage schedules (block 630). For example, the cSON (e.g., using processor 320, memory 330, storage component 340, input component 350, output component 360, communication interface 370, and/or the like) may generate, based on the configuration parameters, one or more operating profiles and one or more respective usage schedules, as described above. The cSON may use a machine learning model to generate the one or more operating profiles and the one or more respective usage schedules. The machine learning model may have been trained using historical performance information concerning one or more dSONs.

As further shown in FIG. 6, process 600 may include sending the configuration parameters, the one or more operating profiles, and the one or more respective usage schedules to an mSON (block 640). For example, the cSON (e.g., using processor 320, memory 330, storage component 340, input component 350, output component 360, communication interface 370, and/or the like) may send the configuration parameters, the one or more operating profiles, and the one or more respective usage schedules to an mSON, as described above.

As further shown in FIG. 6, process 600 may include receiving, from the mSON, after sending the configuration parameters, the one or more operating profiles, and the one or more respective usage schedules, performance information concerning a dSON that applied an operating profile, of the one or more operating profiles, according to a respective usage schedule, of the one or more respective usage schedules (block 650). For example, the cSON (e.g., using processor 320, memory 330, storage component 340, input component 350, output component 360, communication interface 370, and/or the like) may receive, from the mSON, after sending the configuration parameters, the one or more operating profiles, and the one or more respective usage schedules, performance information concerning a dSON that applied an operating profile, of the one or more operating profiles, according to a respective usage schedule, of the one or more respective usage schedules, as described above. The dSON may update the machine learning model based on the performance information.

Process 600 may include additional implementations, such as any single implementation or any combination of implementations described in connection with one or more other processes described elsewhere herein.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise.

What is claimed is:

1. A device associated with a middle-tier self-organizing network (mSON), comprising:
one or more memories; and
one or more processors, communicatively coupled to the one or more memories, to:
obtain configuration parameters concerning a cluster, one or more operating profiles, and one or more usage schedules respectively associated with the one or more operating profiles, from a centralized self-organizing network (cSON),
wherein the cluster includes one or more distributed self-organizing networks (dSONs) and one or more base stations that are associated with the one or more dSONs, and
wherein the configuration parameters provide identification information of the one or more dSONs, and capability information of one or more capabilities of the one or more base stations;
identify, based on the identification information, a dSON of the one or more dSONs;
select, based on identifying the dSON and the capability information, an operating profile of the one or more operating profiles, and a respective usage schedule of the one or more usage schedules, for the dSON,
wherein the dSON is to apply the operating profile to a base station of the one or more base stations according to the respective usage schedule to control a functionality of the base station;
generate, based on the configuration parameters, monitoring information of the base station; and
send the operating profile, the respective usage schedule, and the monitoring information to the dSON.

2. The device of claim 1, wherein the one or more processors are further to:
receive performance information from the dSON;
select, based on the performance information, a different operating profile, of the one or more operating profiles, and a respective different usage schedule of the one or more usage schedules; and
send the different operating profile and the respective different usage schedule to the dSON.

3. The device of claim 2, wherein the one or more processors are further to:
send the performance information to the cSON to permit the cSON to update a machine learning model associated with generating the one or more operating profiles and the one or more usage schedules.

4. The device of claim 1, wherein the one or more processors are further to:
receive, from the dSON, after sending the operating profile, the respective usage schedule, and the monitoring information to the dSON, performance information concerning the dSON;
receive, from one or more additional dSONs in the cluster, additional performance information concerning the one or more additional dSONs;
determine a performance of the cluster based on the performance information concerning the dSON and the additional performance information concerning the one or more additional dSONs;

select, based on the performance of the cluster, a different operating profile, of the one or more operating profiles, and a respective different usage schedule of the one or more usage schedules; and send the different operating profile and the respective different usage schedule to the dSON.

5. The device of claim 1, wherein the one or more processors are further to:

receive, from the dSON, after sending the operating profile, the respective usage schedule, and the monitoring information to the dSON, performance information concerning the dSON; and cause, based on the performance information concerning the dSON, the dSON to shut down.

6. The device of claim 1, wherein a first end-to-end transmission time for communications between the dSON and the mSON is less than a second end-to-end transmission time for communications between the dSON and the cSON.

7. The device of claim 1, wherein the one or more processors, when generating the monitoring information, are to:

identify a base station of the one or more base stations associated with the dSON;

determine at least one capability, of the one or more capabilities, of the base station; and generate, based on the configuration parameters, monitoring instructions that concern the at least one capability.

8. The device of claim 1, wherein the one or more processors, when selecting the operating profile and the respective usage schedule, are to:

obtain information concerning at least one performance indicator of the one or more base stations; and select the operating profile and the respective usage schedule based on the at least one performance indicator.

9. The device of claim 8, wherein the at least one performance indicator includes at least one of:

a data rate indicator;
a connection density indicator;
a latency indicator; or
a reliability indicator.

10. A method, comprising:

obtaining, by a distributed self-organizing network (dSON), an operating profile, a usage schedule, and monitoring information from a middle-tier self-organizing network (mSON), wherein the dSON is associated with a base station, wherein the monitoring information provides criteria for monitoring at least one performance indicator of the base station, and wherein the at least one performance indicator relates to a performance of the base station in a wireless telecommunications network that includes the dSON and the base station;

applying, by the dSON, the operating profile according to the usage schedule to control operation of the base station;

identifying, by the dSON and based on the monitoring information, a performance threshold associated with the at least one performance indicator;

determining, by the dSON, whether the at least one performance indicator satisfies the performance threshold;

generating, by the dSON and based on determining whether the at least one performance indicator satisfies the threshold, performance information of the base station in the wireless telecommunications network, wherein the performance information includes at least one of:

a number of times the at least one performance indicator satisfied the performance threshold; or an amount of time the at least one performance indicator satisfied the performance threshold; and sending, by the dSON, the performance information to the mSON.

11. The method of claim 10, further comprising:

obtaining, after sending the performance information to the mSON, a different operating profile and a different usage schedule; and applying the different operating profile according to the different usage schedule.

12. The method of claim 11, further comprising:

monitoring, after applying the different operating profile according to the different usage schedule and based on the monitoring information, the at least one performance indicator of the base station;

generating, by the dSON and based on the monitoring of the at least one performance indicator after applying the different operating profile according to the different usage schedule, an additional performance information; and sending, by the dSON, the additional performance information to the mSON.

13. The method of claim 10, wherein the operating profile is at least one of:

an enhanced mobile broad band profile;
a massive machine-type communication profile;
a connected vehicles profile;
an enhanced multi-media profile;
an internet of things profile;
an ultra-reliable low latency communication profile; or
a fixed wireless access profile.

14. The method of claim 10, wherein applying the operating profile according to the usage schedule comprises:

determining, based on the usage schedule, a period of time in which to apply the operating profile; and causing the base station to operate according to the operating profile during the period of time.

15. The method of claim 10, wherein the at least one performance indicator includes at least one of:

a data rate indicator;
a connection density indicator;
a latency indicator; or
a reliability indicator.

16. A non-transitory computer-readable medium storing instructions, the instructions comprising:

one or more instructions that, when executed by one or more processors associated with a centralized self-organizing network (cSON), cause the one or more processors to:

determine a cluster of a wireless telecommunications network, wherein the cluster includes one or more distributed self-organizing networks (dSONs) and one or more base stations;

determine configuration parameters concerning the cluster, wherein the configuration parameters include one or more operational requirements supported by at least one of the one or more dSONs or the one or more base stations;

generate, based on the one or more operational requirements, one or more operating profiles and one or more respective usage schedules;

send the configuration parameters, the one or more operating profiles, and the one or more respective usage schedules to a middle-tier self-organizing network (mSON); and receive, from the mSON, after sending the configuration parameters, the one or more operating profiles, and the one or more respective usage schedules, performance information concerning a dSON, of the one or more dSONs, that applied an operating profile, of the one or more operating profiles, according to a respective usage schedule, of the one or more respective usage schedules.

17. The non-transitory computer-readable medium of claim 16, wherein the one or more instructions, that cause the one or more processors to generate the one or more operating profiles and the one or more respective usage schedules, cause the one or more processors to:

generate, using a machine learning model, the one or more operating profiles and the one or more respective usage schedules, wherein the machine learning model has been trained using historical performance information concerning the one or more dSONs.

18. The non-transitory computer-readable medium of claim 17, wherein the one or more instructions, when executed by the one or more processors, further cause the one or more processors to:

update the machine learning model based on the received performance information concerning the dSON.

19. The non-transitory computer-readable medium of claim 16, wherein the one or more operating profiles include one or more characteristics for supporting one or more particular types of communication between the one or more dSONs and the one or more base stations.

20. The non-transitory computer-readable medium of claim 16, wherein the one or more instructions, when executed by the one or more processors, further cause the one or more processors to:

generate, based on the performance information, one or more instructions to control the one or more base stations.

* * * * *